United States Patent

Hougen

[11] 4,322,188
[45] Mar. 30, 1982

[54] ANNULAR HOLE CUTTER

[76] Inventor: Everett D. Hougen, G-5072 Corunna Rd., Flint, Mich. 48504

[21] Appl. No.: 183,017

[22] Filed: Sep. 2, 1980

[51] Int. Cl.³ .............. B23B 41/02; B23B 27/10; B23B 51/00
[52] U.S. Cl. .................. 408/206; 408/59; 408/224; 408/703
[58] Field of Search .......... 408/204, 205, 206, 223, 408/224, 225, 703, 57, 59

[56] References Cited

U.S. PATENT DOCUMENTS

| Re. 28,416 | 5/1975 | Hougen | 408/204 |
|---|---|---|---|
| 2,444,099 | 6/1948 | Hennessey, Jr. | 408/206 |
| 2,847,885 | 8/1958 | Wagner | 408/59 |
| 3,130,763 | 4/1964 | Schlosser et al. | 408/205 |
| 3,860,354 | 1/1975 | Hougen | 408/206 |
| 3,977,807 | 8/1976 | Siddall | 408/223 |

*Primary Examiner*—Harrison L. Hinson
*Attorney, Agent, or Firm*—Barnes, Kisselle, Raisch & Choate

[57] ABSTRACT

An annular hole cutter having an inverted cup-shaped body provided with a plurality of circumferentially spaced teeth around its lower edge. Helical flutes extend upwardly between successive teeth and form around the outer periphery of the cutter a plurality of radially relieved lands, each having a circle ground narrow margin at the leading edge thereof. Each tooth has a plurality of radially and axially staggered cutting edges thereon.

7 Claims, 5 Drawing Figures

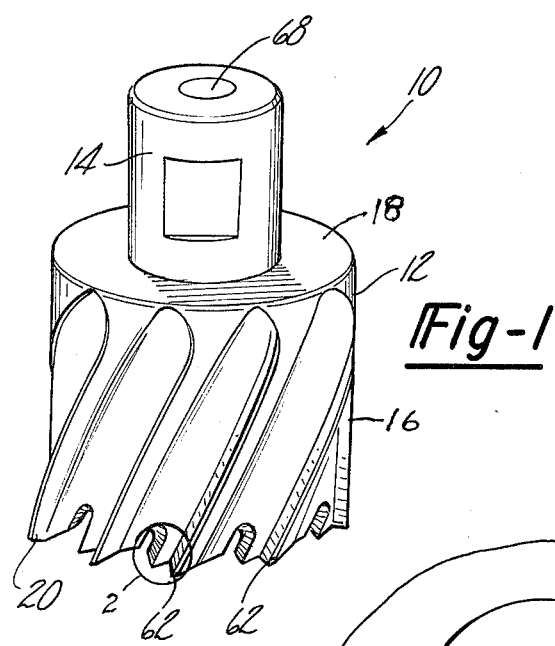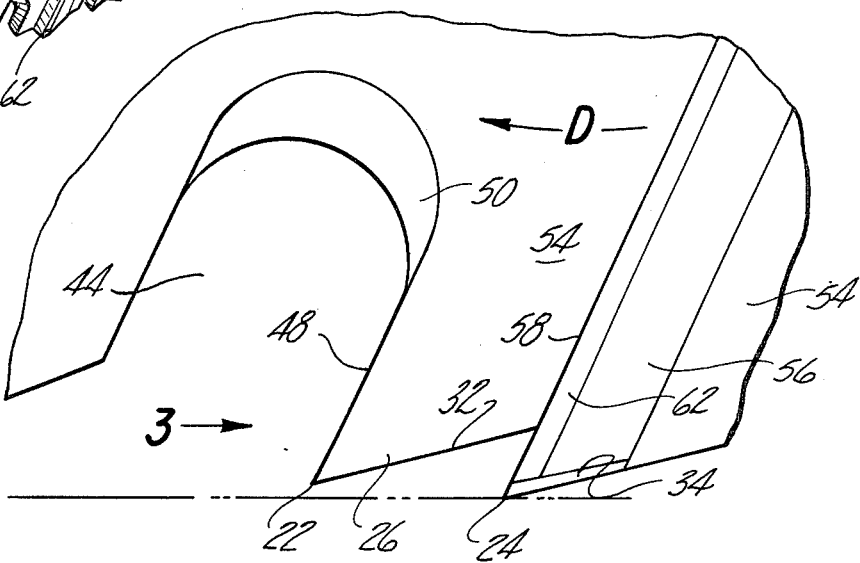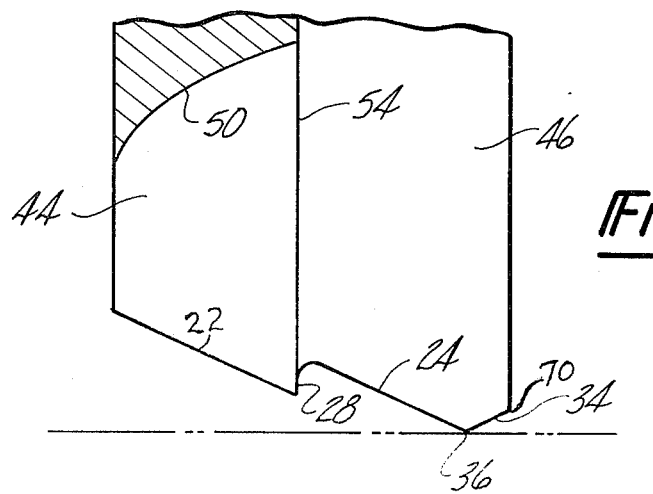

ANNULAR HOLE CUTTER

This invention relates to an annular hole cutter of the fluted type.

The object of this invention is to extend the life of the fluted annular hole cutter and to improve the finish of the holes formed by such cutters.

Fluted type hole cutters, such as conventional twist drills, and annular cutters, such as shown in U.S. Pat. No. 2,444,099 and my prior Reissue Patent No. 28,416, have radially extending cutting edges at the leading end of the tool and generally helical flutes extending upwardly from the cutting edges for discharging chips from the hole being formed. The outer periphery of such hole cutters is defined by lands between the successive flutes. With such cutters it is universal practice to grind or otherwise form the lands with radial relief rearwardly of a circle ground margin at the leading edge of each land. These margins extend axially to the radially outer end of the cutting edges at the leading end of the tool and are provided to impart radial or lateral stability to the cutting tool. Lateral stability is absolutely necessary with end cutting fluted tools of this type in order to maintain hole size and finish.

In annular cutters of the type previously referred to the width of these margins have consistently been in the range of about 0.060 to 0.100 inches regardless of the diameter of the cutter. The width of the margin on such cutters does not vary in accordance with the diameter of the cutter because the tooth load does not vary significantly with diameter since larger cutters usually have more teeth. On the other hand, in the case of twist drills the margin width increases with an increase in diameter since the tooth load on a drill varies in accordance with the diameter of the drill. For example, the margin is about 0.040 inches on a one-half inch drill, about 0.050 inches on a three-quarter inch drill, and about 0.080 inches on a one and one-quarter inch drill. The widths on margins of fluted end cutting tools in the ranges stated above have always been considered necessary not only from the standpoint of imparting lateral stability to the cutter, but also to prevent rapid and excessive wear at the junction of the margins and the cutting edges at the leading end of the tool.

Heretofore it has always been believed that the susceptability to rapid wear of the outer ends of the cutting edges of such tools was related to the strength of the cutting edges at this location. Thus, a relatively large margin was deemed necessary in order to provide sufficient mass at the outer end of the cutting edges to withstand the cutting load and to dissipate the heat generated at this location. In the case of twist drills having two cutting edges, this reasoning is apparently sound. However, in the case of annular cutters of the type disclosed in my prior Reissue Patent No. 28,416, contrary to the assumptions which have governed the determination of the minimum margin width required, I have found that if the leading edge of each land is provided with a relatively narrow margin the tool life is actually extended substantially and the hole finish is improved as compared with the provision of a relatively wide margin.

In the drawings:

FIG. 1 is a perspective view of an annular cutter embodying the present invention;

FIG. 2 is an enlarged fragmentary view of a portion of the cutter shown in FIG. 1 designated by the circle 2;

FIG. 3 is a fragmentary view of one tooth of the cutter;

Figure 5:
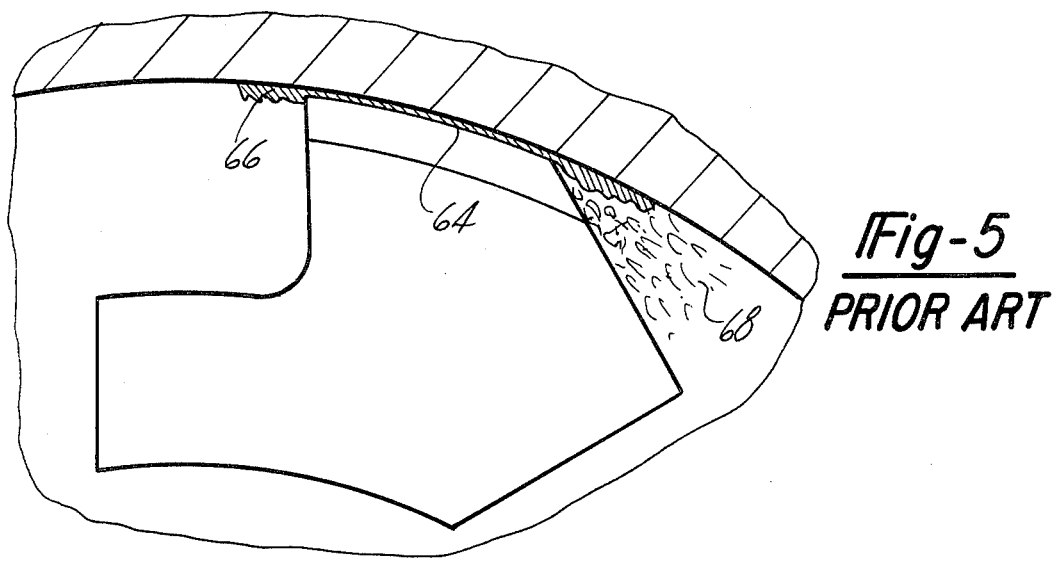
FIG. 5 is a view similar to FIG. 4 and showing a cutter constructed in accordance with the prior art.

Referring first to FIG. 1, the annular hole cutter of this invention is generally designated 10 and includes a cutter body 12 and an arbor 14. Cutter body 12 is of inverted cup shape having a side wall 16 and a top wall 18. The lower end of side wall 16 is formed with a plurality of regularly spaced cutting teeth 20. Each cutting tooth 20 is formed with a radially inner cutting edge 22 and a radially outer cutting edge 24. These cutting edges are best illustrated in FIGS. 2 and 3. As shown in FIG. 2, cutting edge 22 is spaced forwardly (in the direction of rotation as designated by the arrow D) from the cutting edge 24. These two cutting edges are separated circumferentially by a shoulder 26 (FIG. 4) and are staggered vertically or axially as shown in FIG. 3. The two cutting edges 22,24 are staggered both radially and axially so that when the cutter is fed into a workpiece the cutting edges 22,24 cooperate to cut an annular groove in the workpiece and each cutting edge cuts its own individual chip. The bottom of the groove cut in the workpiece has a contour in cross section which is complementary to the contour of the cutting edges 22,24 as shown in FIG. 3. In other words, the groove cut in the workpiece has a concentric radial shoulder defined by the portion of the circumferential shoulder 26 on each tooth designated 28 in FIG. 3.

Figure 4:
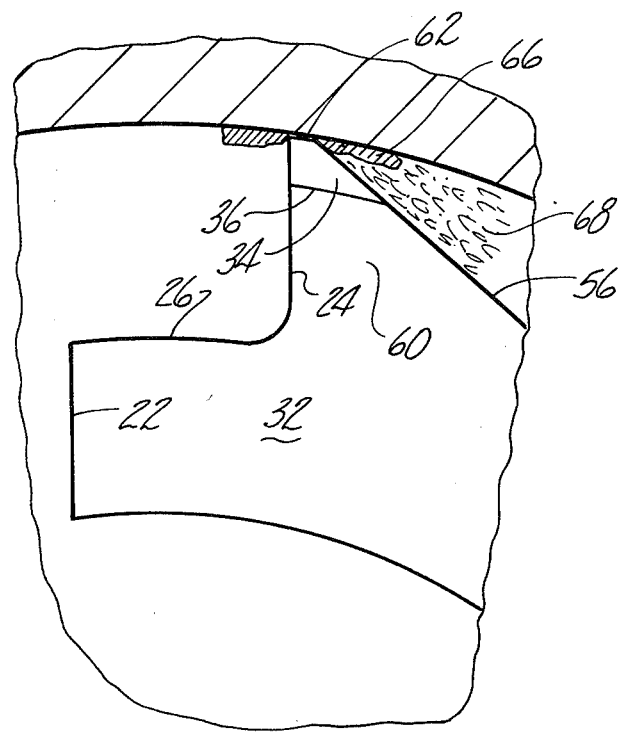
FIG. 4 is a fragmentary end view of one tooth of the cutter illustrating what is believed to be one reason why the cutter of the present invention produces superior results.

As shown in FIGS. 2 and 4, the bottom face of each tooth is formed with two back-off or clearance faces 32,34. In the operative condition of the cutter the back-off face 32 inclines axially upward in a radially inward direction and back-off face 34 inclines axially upward in a radially outward direction. In addition, each of these back-off faces inclines upwardly from the cutting edges 22,24 in a circumferential direction to provide the necessary clearance. The two back-off faces intersect in a crest 36 which in turns intersects the outer cutting edge 24.

The cutter is provided with a gullet 44 and a flute 46 between successive teeth. Each gullet 44 adjacent cutting edge 22 is defined by a front rake face 48 which slopes upwardly and rearwardly relative to the direction of rotation of the cutter. The upper end of each gullet 44 is defined by a curved surface 50 which slopes upwardly in a radially outward direction as shown in FIG. 3 for discharging chips cut by edge 22 into the adjacent flute 46. Each flute 46 extends spirally upwardly around the outer periphery of side wall 12. Each flute is defined by an inner circumferentially extending face 54 which is flush with shoulder 26, a leading face 56 and a trailing face 58. The leading face 56 of each flute 46 comprises the rear face of a land 60 between each of the flutes 46. Face 56 inclines radially inwardly so as to provide radial relief directly adjacent each outer cutting edge 24. The cutter thus far described is generally the same as that shown in my Reissue Patent No. 28,416.

Adjacent the leading edge of each face 56 each land 60 is provided with a narrow margin 62 which is circle ground to the desired diameter of the cutter. In the tool of this invention margin 62 has a circumferential width of between about 0.005 to about 0.030 inches and preferably not more than about 0.025 inches. For reasons not readily apparent, when the width of margin 62 lies within this range the life of the cutting edges 22,24 before requiring resharpening is very markedly increased and the finish of the hole formed by the cutter is very substantially improved over the tool life and surface finish obtained when the width of the margin is at least 0.060 inches.

While the reasons for the improved performance of the cutter having the narrow margin referred to are not entirely understood, it is believed that the improved results are attributable to some extent to the fact that an annular cutter of the type disclosed is inherently much more stable in a lateral or a radial direction than a twist drill or other types of fluted annular cutters. As distinguished from a twist drill, the annular cutter of this invention has at least six teeth as contrasted to a conventional twist drill which has only two cutting edges. In addition, the cutter of this invention has at least two radially and circumferentially staggered cutting edges of each tooth, each cutting edge being designed to cut an individual chip. Therefore, the cutter inherently has substantial lateral stability because of the number of teeth on the cutter and also because of the concentric shoulder (designated 28 in FIG. 3) formed in the groove cut by the teeth of the cutter. It is believed that because of the inherent lateral stability of the cutter a very narrow margin at the leading end of each land can be tolerated without sacrificing lateral stability.

A comparison of FIGS. 4 and 5 indicates one reason it is believed the cutter of this invention produces a much finer finish on the hold formed as compared with a prior art cutter having a relatively wide margin. For example, the prior art cutter illustrated in FIG. 5 is substantially identical to that illustrated in FIG. 4 except that the margin 64 has a width of at least 0.060 inches as compared with the margin 62 in FIG. 4 having a width of about 0.010 inches.

With a relatively wide margin such as illustrated at 64 in FIG. 5 it follows that, if there is an obstruction between the margin 64 and the side wall of the hole, the unit pressure on the obstruction is substantially less and the friction is substantially greater than where the margin is very narrow as indicated at 62 in FIG. 4. Thus, if a chip 66 cut by one of the cutting edges of the tool becomes wedged between the side wall of the hole being formed and the margin 64, the portion of the chip wedged between margin 64 and the side wall of the hole becomes trapped and may become heated to a relatively high temperature because of the friction generated therebetween. Under such conditions the chip 66 can produce galling on the tool and on the side wall of the tool and, if heated to a sufficiently high temperature, can actually weld to the margin 64. On the other hand, if the margin is relatively narrow as illustrated at 62 in FIG. 4, the portion of the chip 66 which may become trapped between the narrow margin and the side wall of the hole is subjected to an extremely high unit pressure which will tend to shear or break the chip before it becomes sufficiently heated to cause galling or welding.

It is believed that the high unit pressure resulting from a very narrow land and the ability to more effectively cool the outer end portion of the outer cutting edges 24 contribute to the substantially longer life of the tool of the present invention. As shown in FIG. 1, a conventional coolant passageway 68 is formed in the shank of the tool for conducting coolant within the cup-shaped cutter down to the cutting edges 22,24. The coolant flows down to the cutting edges and then radially outwardly to the outer periphery of the cutter. This coolant is designated 68 in FIGS. 4 and 5. It will be observed from the showing in FIG. 4 that the coolant 68 flows to an area much closer to the outer end of cutting edge 24 than does the coolant where the cutter has a wide land such as shown at 64 in FIG. 5. The flow of coolant closer to the outer end of cutting edge 24 coupled with the fact that the mass of the tooth directly behind the outer end of cutting edge 24 is substantially smaller with a narrow margin as compared with a wide margin maintains the temperature of the outer end portion of each cutting edge 24 (the most vulnerable portion of the cutting edge) substantially lower. It follows that the cutting edge will stay sharp a substantially longer period of time if it is prevented from becoming overheated.

It is also believed that a very narrow land prevents rapid and excessive wearing of the outer end portion of the outer cutting edge because, as pointed out previously, a very narrow land results in a relatively high unit pressure. The high unit pressure, as distinguished from a relatively low unit pressure, will enable the outer end portion of the cutting edge to penetrate sufficiently into the material being cut so that it will shear the material rather than producing frictional drag thereover. It must be appreciated that, because of the run-out of tool spindles and because of the impracticality of forming a tool where the margins define a circle truly concentric to the axis of the cutter, a radial load between the margins at the leading end of the cutter and the side wall of the hole being formed is inevitable. However, if this radial load is reflected by a relatively high unit pressure, the margin will actually penetrate into and shear the metal in the manner of a cutting edge. However, when the margin is relatively wide, the radial load on the leading end of the cutter results in a relatively low unit pressure which is not sufficient to cause penetration. As a result, heat is generated and wear is encountered. This becomes progressively worse and results in tooth chipping and excessive wear of both cutting edges and especially at the outer end portions of the outer cutting edges 24.

It has also been found that, as distinguished from conventional annular cutters of the fluted type which have a back taper of about 0.002 to 0.003 inches per axial inch, when the cutter is provided with a margin of not more than about 0.030 inches, and preferably less, the performance of the cutter is enhanced if the back taper is entirely eliminated or reduced to a value of not more than about 0.0005 inches per axial inch of length. By reducing the back taper to a minimum is believed that the lateral stability is improved since even a narrow land of sufficient length will not result in an unduly high unit pressure as to cause the margin to penetrate into the side wall of the hole being formed along its entire length. In addition, when the back taper is eliminated or reduced to about 0.0005 inches, the cutter can be resharpened repeatedly without substantially reducing its outer diameter.

TABLE I

| Margin Width | Number of Holes | Peripheral Wear (in.) | Tooth Wear (in.) | H.P. | Surface Finish |
| --- | --- | --- | --- | --- | --- |
| .090" | 50 | .005 | .004–.0075 | 1.5–2.2 | 250 |
| | 100 | .005 | .010–.012 | 1.5–2.6 | 350 |
| .040" | 50 | .006 | .045–.010 | 1.6–1.8 | 100 |
| | 100 | .006 | .009–.013 | 1.7–2.3 | 250 |

TABLE I-continued

| Margin Width | Number of Holes | Peripheral Wear (in.) | Tooth Wear (in.) | H.P. | Surface Finish |
|---|---|---|---|---|---|
| .030" | 50 | .002 | .005–.0075 | 1.5–1.7 | 100 |
|  | 100 | .003 | .007–.008 | 1.6–2.0 | 250 |
|  | 150 | .005 | .0105–.0125 | 1.4–2.0 | 250 |
| .0275" | 50 | .001 | .0025–.004 | 1.5–1.7 | 100 |
|  | 100 | .003 | .006–.008 | 1.4–1.9 | 100 |
|  | 150 | .0045 | .008–.013 | 1.5–1.9 | 125 |
| .020" | 50 | .0005 | .003–.005 | 1.5–1.7 | 125 |
|  | 100 | .0015 | .0045–.006 | 1.5–1.8 | 250 |
|  | 150 | .003 | .005–.008 | 1.5–1.9 | 350 |
|  | 200 | .005 | .008–.010 | 1.6–1.9 | 350 |
| .015" | 50 | .002 | .003–.0045 | 1.5–1.8 | 63 |
|  | 100 | .003 | .004–.0055 | 1.6–1.9 | 75 |
|  | 150 | .004 | .006–.008 | 1.5–1.8 | 100 |
|  | 200 | .005 | .009–.011 | 1.6–1.8 | 100 |
|  | 250 | .005 | .010–.013 | 1.6–1.9 | 100 |
| .005 to .010" | 50 | .001 | .0015–.0025 | 1.4–1.6 | 75 |
|  | 100 | .002 | .004–.005 | 1.5–1.7 | 75 |
|  | 150 | .003 | .006–.008 | 1.5–1.7 | 75 |
|  | 200 | .0035 | .007–.009 | 1.4–1.7 | 75 |
|  | 250 | .004 | .008–.010 | 1.4–1.6 | 75 |
|  | 300 | .005 | .011–.0135 | 1.4–1.7 | 75 |

Table I sets forth the results of tests conducted with cutters of the type shown in FIG. 1 having margins of different widths. The holes were cut in one inch thick steel commercially known as "Jalloy" which has a carbon content of about 0.30%, a manganese content of about 1.65%, chromium about 1.2%, silicon in the range of about 0.15 to 0.30% and other lesser ingredients. The steel had a Rockwell C hardness of between 28 and 32. This steel was selected because it is normally considered difficult to cut holes therein and obtain a good finish. In all of the tests conducted the machine tool spindle on which the cutters were mounted was rotated at 250 r.p.m. with a feed rate of 3.5 inches per minute. The horsepower required to rotate the spindle was continually observed and recorded. After every fifty holes the peripheral wear, the tooth wear, and the surface finish of the hole were measured. The peripheral wear reflects the decrease in diameter at the leading end of the cutter. The column designated "tooth wear" is a measurement of the widths in a circumferential direction of the flat areas worn on the originally sharp pointed teeth. The surface finish indicated is in terms of the shape turn microfinish. Each cutter was formed with six teeth, had a diameter of 13/16 inches and a wall thickness of about 0.155 inches.

The first hole cut with each cutter had a surface finish of 75 shape turns with the exception of the cutter having a margin width of 0.015 inches which had a surface finish of 63 shape turns. A visual examination of the cutters after every fifty holes clearly showed that as the outer corner of each outer cutting edge, the corner designated 70 in FIG. 3, became increasingly rounded through wear the horsepower required to rotate the cutter increased. Through experience it has been learned that with the particular machine used in the test, when the horsepower begins to exceed 2, there is a strong likelihood that, if use of the cutter is continued substantially without resharpening, it will sieze in the work and break. Accordingly, in view of the results of the tests conducted, it has been determined that the width of the margin should not exceed about 0.030 inches. The minimum margin width should be about 0.005 inches to allow use of the cutter in a drill bushing, but a margin width of this magnitude is impractical from the commercial standpoint because it would be difficult to maintain such close tolerances economically on a production basis. Therefore, if grinding tolerances can be held to about ±0.0125", the nominal width of the margin should be about 0.0175". As a measure of safety it is preferred to maintain the margin width at not more than about 0.025".

I claim:

1. An annular hole cutter comprising an inverted cup-shaped body having a top wall and an annular side wall, said side wall having a plurality of circumferentially spaced cutting teeth around its lower end, each cutting tooth having at least two radially extending cutting edges thereon, the cutting edges on each tooth being staggered circumferentially and axially, said side wall having helical flutes extending upwardly between successive teeth, the circumferentially successive flutes being separated by helical lands, the leading edge portion of each land comprising a margin concentric to the axis of the cutter and extending axially to the radially outermost cutting edge, said lands being radially relieved directly behind each margin, said margins having a circumferential width of not more than about 0.030 inches adjacent said cutting edges.

2. An annular hole cutter as called for in claim 1 wherein said margins are of substantially uniform width throughout the axial extent thereof.

3. An annular hole cutter as called for in claim 1 wherein said margins have a circumferential width of less than about 0.025 inches.

4. An annular hole cutter as called for in claim 1 wherein said margins have a nominal width of about 0.0175 inches.

5. An annular hole cutter as called for in claim 1 wherein said margins have a minimum circumferential width of about 0.005 inches.

6. An annular hole cutter as called for in claim 1 wherein the side wall of the cutter has a back taper around the outer periphery thereof of not more than about 0.0005 inches per inch of length 7. An annular hole cutter as called for in claim 1 wherein said cutter has a shank extending upwardly from said top wall, said shank having a coolant passageway therein extending through said top wall and into said body for conducting coolant to said teeth.

* * * * *